United States Patent
Carnevale et al.

(10) Patent No.: US 7,229,036 B2
(45) Date of Patent: Jun. 12, 2007

(54) FOOD PROCESSING APPLIANCE WITH INDICATOR

(75) Inventors: Francesco Leopoldo Carnevale, Glen Allen, VA (US); James H. Hallar, Richmond, VA (US)

(73) Assignee: Hamilton Beach/Proctor Silex, Inc., Glen Allen, VA (US)

( * ) Notice: Subject to any disclaimer, the term of this patent is extended or adjusted under 35 U.S.C. 154(b) by 597 days.

(21) Appl. No.: 10/780,975

(22) Filed: Feb. 18, 2004

(65) Prior Publication Data
US 2005/0178863 A1    Aug. 18, 2005

(51) Int. Cl.
*B02C 25/00*    (2006.01)
*B02B 5/02*    (2006.01)

(52) U.S. Cl. ............... 241/36; 241/37.5; 241/101.3; 241/92

(58) Field of Classification Search ............... 241/36, 241/37.5, 101.3, 278.1, 92; 99/510, 492, 99/337
See application file for complete search history.

(56) References Cited

U.S. PATENT DOCUMENTS

| | | | |
|---|---|---|---|
| 4,111,372 A | 9/1978 | Hicks et al. | |
| 4,143,824 A | 3/1979 | Shiotani | |
| 4,228,963 A | 10/1980 | Yamauchi et al. | |
| 4,269,519 A | 5/1981 | Birr | |
| 4,316,584 A | 2/1982 | Valbona | |
| 4,325,643 A | 4/1982 | Scott et al. | |
| 4,371,118 A | 2/1983 | Sontheimer et al. | |
| 4,387,860 A | 6/1983 | Necas et al. | |
| 4,623,097 A | 11/1986 | Sontheimer | |
| 4,674,690 A | 6/1987 | Ponikwia et al. | |
| 5,037,033 A * | 8/1991 | Stottmann et al. | 241/37.5 |
| 5,355,784 A | 10/1994 | Franklin et al. | |
| 5,417,152 A | 5/1995 | Harrison | |
| 6,397,735 B1 | 6/2002 | Wong | |
| 6,669,124 B2 * | 12/2003 | Lazzer et al. | 241/36 |
| 6,986,475 B2 * | 1/2006 | Wanat | 241/37.5 |
| 7,028,930 B2 * | 4/2006 | Carnevale | 241/37.5 |
| 7,069,839 B2 * | 7/2006 | Kernan | 99/337 |

OTHER PUBLICATIONS

Photograph of Simatelax Manufactory Co. Ltd. Chopper with ready light-admitted prior art.

* cited by examiner

*Primary Examiner*—Faye Francis
(74) *Attorney, Agent, or Firm*—Akin Gump Strauss Hauer & Feld LLP

(57) ABSTRACT

A food processing appliance for processing food stuff including a housing and an electric motor mounted within the housing. A bowl lid is removably mountable over the bowl. The bowl is mounted to the housing and the bowl lid is mounted over the bowl in a working position. A control mechanism is mounted to the housing and is operatively connected to the motor. A sensor is positioned on the housing and transmits a signal when the bowl and bowl lid are in the working position. An indicator includes a transparent plate mounted around a periphery of the control mechanism. The indicator visually indicates that the bowl and bowl lid are in the working position upon receiving the signal from the sensor such that power can be provided to the electric motor.

4 Claims, 7 Drawing Sheets

FOOD PROCESSING APPLIANCE WITH INDICATOR

BACKGROUND OF THE INVENTION

The present application is directed to a food processing appliance and, more particularly, to a food processing appliance with an indicator.

Food processing appliances may include a ready light that is illuminated when the components of the food processing appliance are assembled in a working position. For example, Simatelex Manufactory Co., Ltd. manufactures a chopper including a housing, bowl and bowl lid. A ready light on an external surface of the Simatelex chopper is illuminated when the bowl is mounted to the housing and the lid is mounted to the bowl in a working position. The ready light indicates that the chopper is assembled in the working position and that power may be provided to a chopper motor.

The preferred embodiment of the food processing appliance with the indicator in accordance with the present application includes an indicator that is mounted around a periphery of a control mechanism. Mounting of the indicator around the control mechanism provides a visual indication to a user that the food processing appliance is assembled in a working position. The indicator highlights to the user that the food processing appliance may begin processing food when the control mechanism is actuated.

BRIEF SUMMARY OF THE INVENTION

A preferred embodiment of the present application comprises a food processing appliance for processing foodstuff including a housing and an electric motor mounted within the housing. A bowl is removably mountable to the housing and a bowl lid is removably mountable over the bowl. The bowl is mounted to the housing and the bowl lid is mounted over the bowl in a working position to enable power to be applied to the motor. A control mechanism is mounted to the housing and is operatively connected to the electric motor. A sensor transmits a signal when the bowl and bowl lid are in the working position. An indicator includes a transparent plate mounted around a periphery of the control mechanism. The indicator visually indicates that the bowl and bowl lid are in the working position upon receiving a signal from the sensor.

In another aspect, a preferred embodiment of the present application is directed to a food processing appliance for processing foodstuff including a housing and a bowl removably mountable to the housing. A bowl lid is removably mountable over the bowl. A feed tube extends from a top bowl lid wall of the bowl lid and includes a feed mouth. A feed tube cover at least partially covers the feed mouth in a closed position. The feed tube cover is movable between a loading position and the closed position. An indicator on the housing indicates when the feed tube cover is in the closed position, the bowl lid is mounted over the bowl and the bowl is mounted to the housing in an operating position.

In yet another aspect, a preferred embodiment of the present application is directed to an indicator for an electric food processing appliance. The food processing appliance includes a housing, a bowl and a bowl lid. The indicator includes a transparent plate mounted to the housing. The transparent plate includes an exposed surface that is visible on an external surface of the housing. A reflector is mounted within the housing. A light emitting device directs light onto the transparent plate when the bowl and bowl lid are in a working position.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating a food processing appliance with an indicator of the present invention, there is shown in the drawings preferred embodiments. It should be understood, however, that the invention is not limited to the precise arrangements and instrumentalities shown. In the drawings.

DETAILED DESCRIPTION OF THE INVENTION

Figure 1:
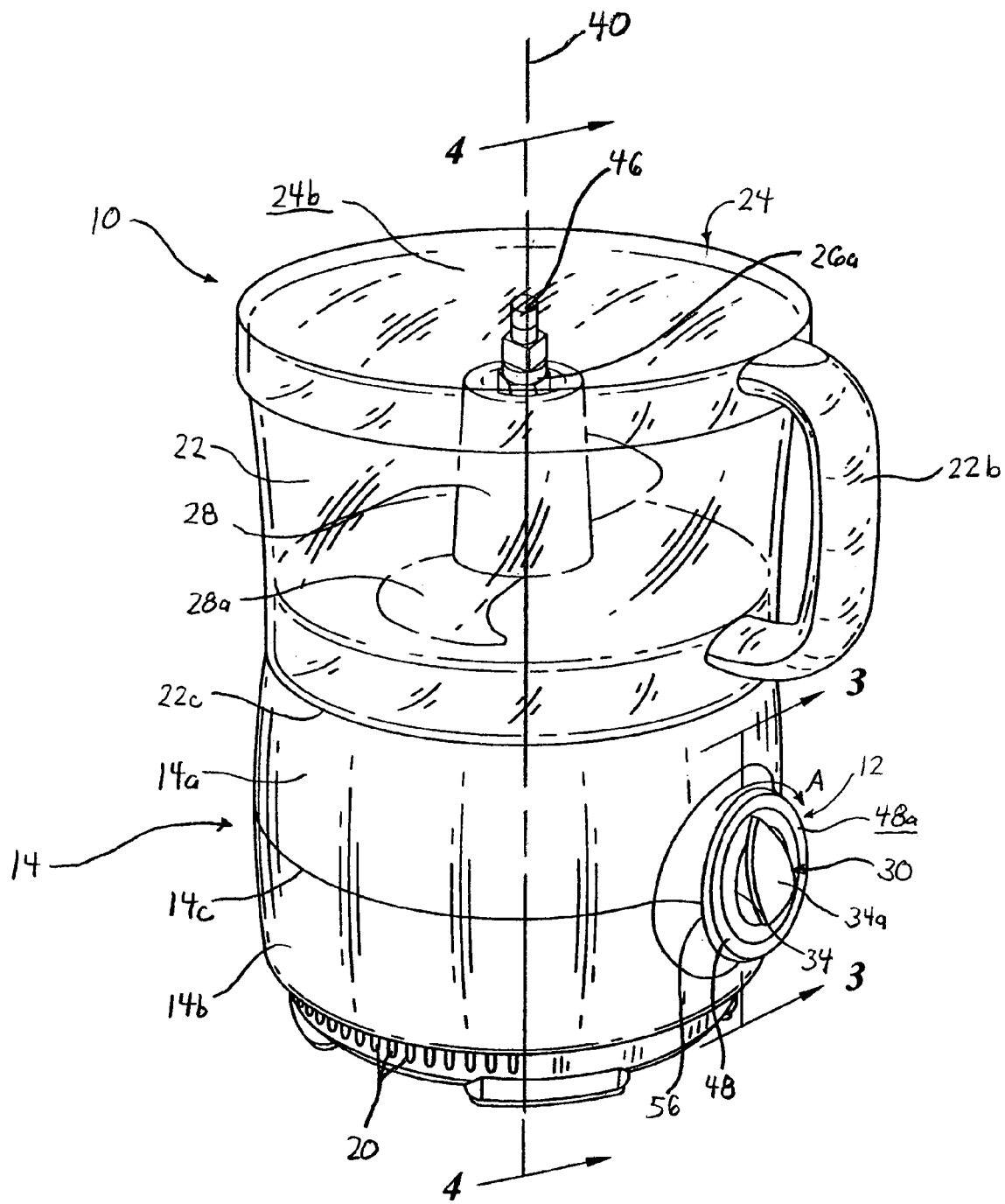
FIG. 1 is a top perspective view of a food processing appliance including an indicator in accordance with a first preferred embodiment of the present invention.

Certain terminology is used in the following description for convenience only and is not limiting. The words "inwardly" and "outwardly" refer to directions toward and away from, respectively, the geometric center of the food processing appliance, indicator and designated parts thereof. The terminology includes the above-listed words, derivatives thereof and words of similar import.

Referring to the drawings in detail, wherein like numerals indicate like elements throughout, there is shown in FIGS. 1–4, a first preferred embodiment of a food processing appliance 10 for processing foodstuff, in accordance with the present invention. In the preferred embodiment, the food processing appliance 10 includes a housing 14 with an electric motor 16 mounted within the housing 14. The housing 14 is comprised of a first shell half 14a and a second shell half 14b that are connected at a parting line 14c. The housing 14 is preferably constructed using the first and second shell halves 14a, 14b for ease of construction using an injection molding process and to accommodate the electric motor 16 and other components of the food processing appliance 10 therein. The housing 14 has a generally cylindrical shape when assembled with generally closed ends.

In the preferred embodiment, the electric motor 16 includes a motor shaft 16a extending therethrough with a cooling fan 16b mounted adjacent one end and a drive gear 18 mounted adjacent an opposite end. The cooling fan 16b preferably draws air into the housing 14 through vent holes 20 in the bottom end of the housing 14 to cool the motor 16.

Figure 2:
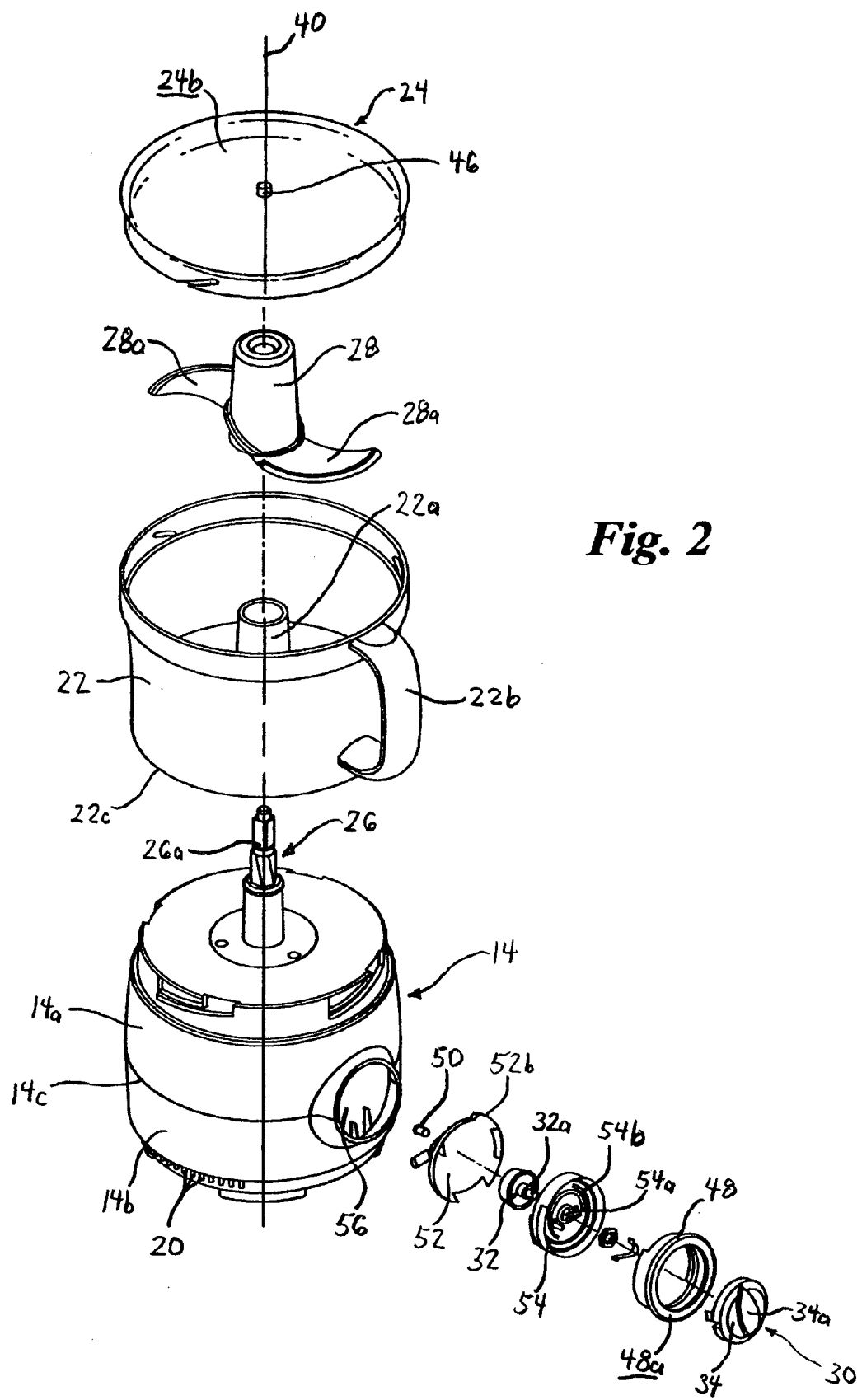
FIG. 2 is a partially exploded perspective view of the food processing appliance with indicator shown in FIG. 1.
Figure 4:
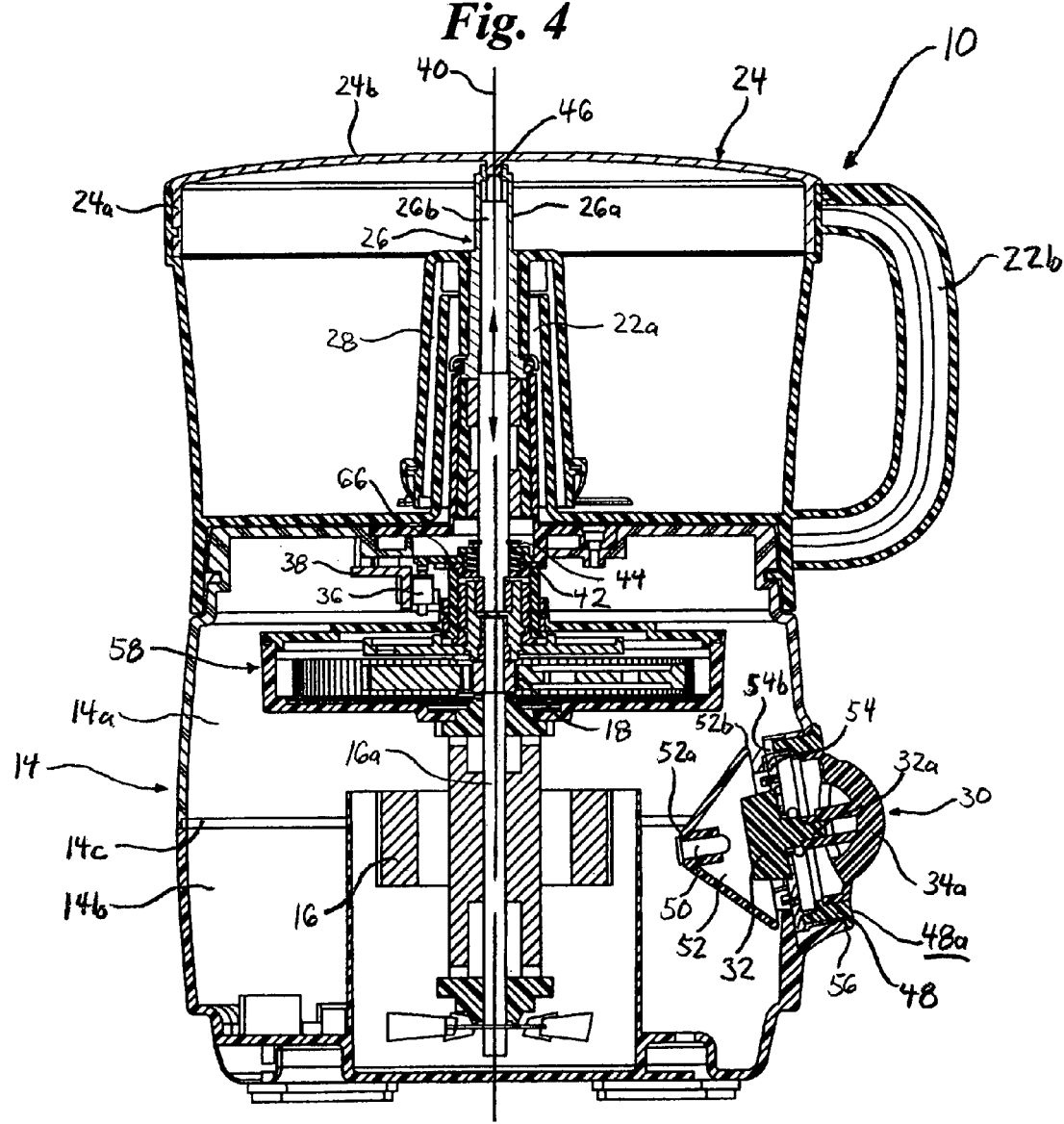
FIG. 4 is a cross-sectional view of the food processing appliance shown in FIG. 1, taken along line 4—4 of FIG. 1.

Referring to FIGS. 1, 2 and 4, a bowl 22 is removably mountable to the housing 14 and a bowl lid 24 is removably mountable over the bowl 22. In the preferred embodiment, the bowl 22 includes a central sleeve 22a having a generally cylindrical shape that extends upwardly from a bottom surface of the bowl 22. The sleeve 22a accommodates a drive shaft 26 that extends into the bowl 22 when the bowl 22 is mounted to the housing 14. The preferred bowl 22 includes a handle 22b that may be used to transport the bowl 22 or to provide leverage for mounting the bowl 22 to the housing 14. In addition, the bowl 22 includes a lower rim 22c that extends downwardly from a base of the bowl 22. The lower rim 22c accommodates mounting of the bowl 22 to the housing 14 using a bayonet connection.

The preferred bowl lid 24 includes a skirt 24a that extends downwardly from a periphery of the bowl lid 24 and a top bowl lid wall 24b. The skirt 24a accommodates mounting of the bowl lid 24 to the bowl 22 using a bayonet-type attachment. The bowl 22 is not limited to a bayonet attachment to the housing 14 using the rim 22c and the bowl lid 24 is not limited to the bayonet attachment to the bowl 22 using the skirt 24a. The bowl 22 may be mounted to the housing 14 and the bowl lid 24 may be mounted to the bowl 22 using nearly any mounting mechanism that would be obvious to one having ordinary skill in the art, for example, clamping, fastening, bolting, riveting or like alternative fastening mechanisms.

In the preferred embodiment, the bowl 22, bowl lid 24 and their integral or associated components are constructed of a molded styrene acrylonitrile material (SAN). The bowl 22 and bowl lid 24 are not limited to constructions using molded SAN material and may be constructed of nearly any polymeric, metal, glass or like material that is able to take on the general shape of the bowl 22 and bowl lid 24 and withstand the normal operating conditions of the bowl 22 and bowl lid 24. However, the SAN material is preferred due to its transparent appearance when molded, its generally smooth finished surface appearance, its relatively light weight and its relatively high impact resistance.

In a working position, the bowl 22 is mounted to the housing 14 and the bowl lid 24 is mounted over the bowl 22. In addition, in the preferred embodiment, a tool 28 is mounted within the bowl 22 in the working position such that it is rotatably engaged with the portion of the drive shaft 26 that extends through sleeve 22a. In the working position, the bowl lid 24 covers a mouth of the bowl 22 such that a user is unable to gain access to a blade 28a of the tool 28. Accordingly, in the working position, a user will not be cut by the rotating blade because access to the blade 28a is blocked by the housing 14, bowl 22 and bowl lid 24.

Referring to FIGS. 1–4, a control mechanism 30 is mounted to the housing 14 and is operatively connected to the electric motor 16 in a manner that would be obvious to one having ordinary skill in the art. In the preferred embodiment, the control mechanism 30 is comprised of a rotary switch 32 with a generally circular dial 34 that is exposed from a surface of the housing 14. The control mechanism 30 is preferably mounted between the first and second shell halves 14a, 14b at the parting line 14c of the housing 14. However, the control mechanism 30 is not limited to being mounted to housing 14 at the parting line 14c and may be mounted anywhere on the surface of the housing 14 as long as the control mechanism 30 is exposed from a surface of the housing 14 when the bowl 22 and bowl lid 24 are in the working position. The dial 34 preferably includes a fin 34a that extends from its exposed surface and an engagement mechanism 34b that extends from an opposite surface to engage a control shaft 32a of the rotary switch 32.

Referring to FIG. 1, in the preferred embodiment, the rotary switch 32 is comprised of an electric dial switch 32 having six positions. The preferred switch 32 is in an off position when it is positioned as is shown in FIG. 1 with the fin 34a oriented generally vertically with respect to the housing 14. From the off position, the fin 34a may be rotated in a counterclockwise direction (opposite to the arrow A) in FIG. 1 to a pulse position or the fin 34a may be rotated in a clockwise direction (the direction of the arrow A) to four separate processing positions that increase the speed of the motor shaft 16a as the fin 34a moves further in the direction of the arrow A. The preferred switch 32 operates and is constructed in essentially the same manner as the switch disclosed in U.S. Pat. No. 5,967,304, which is incorporated herein by reference. The control mechanism 30 is not limited to configurations including the rotary switch 32 and dial 34 or to the specific rotary switch arrangement described above with the six switch locations. For example, the control mechanism 30 may be comprised of a single momentary switch that actuates the motor shaft 16a to rotate only when the control mechanism 30 is depressed or may be comprised of a plurality of separate buttons (not shown) that actuate the food processing appliance 10 to operate when one or more of the buttons is depressed.

In the preferred embodiment, the dial 34 is constructed of an injection molded SAN material. The dial 34 is not limited to constructions comprising the injection molded SAN material and may be constructed of nearly any generally rigid material that is able to take on the general shape of the dial 34 and withstand the normal operating conditions of the dial 34.

Figure 3:
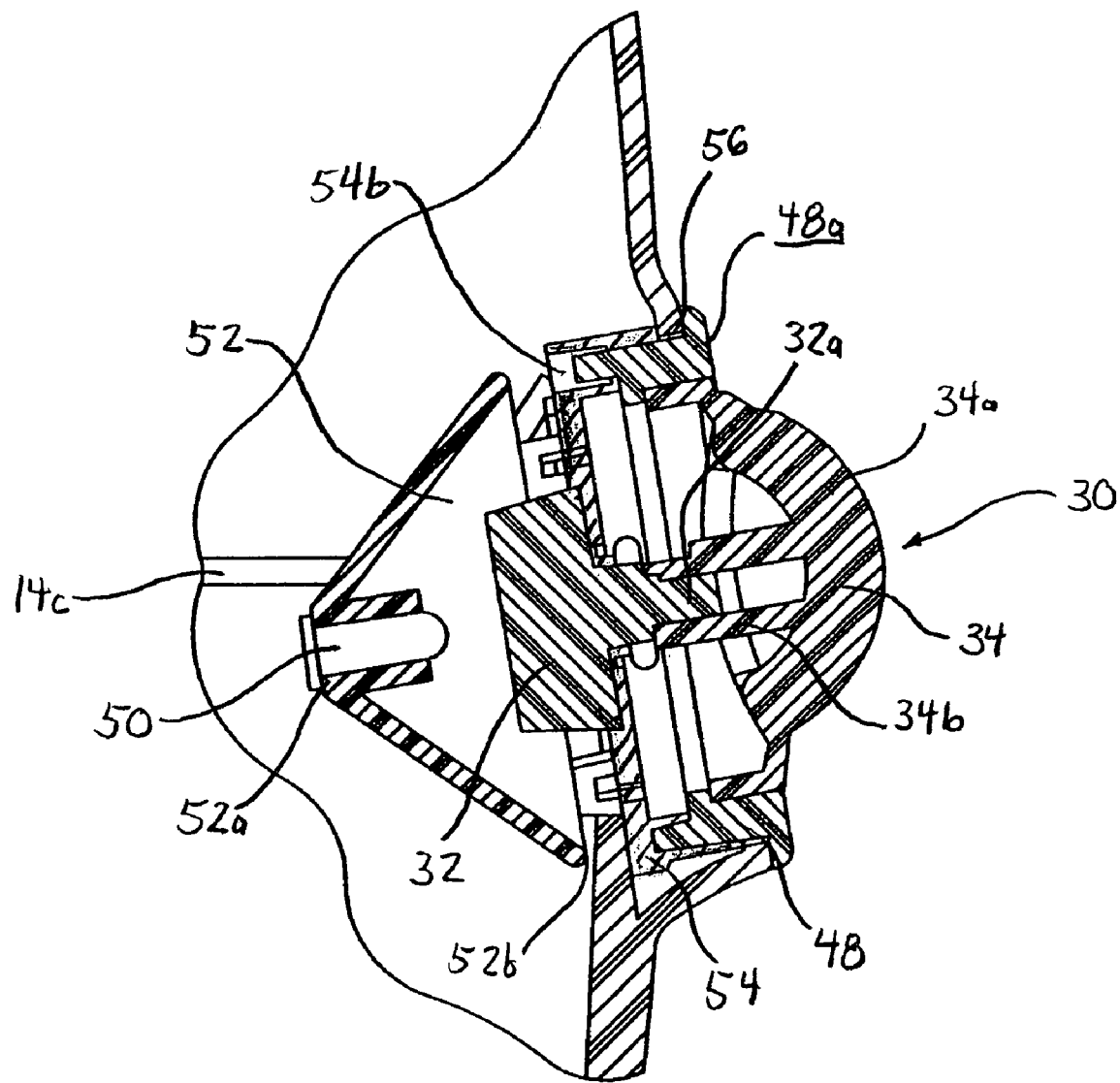
FIG. 3 is an enlarged cross-sectional view of the indicator of the food processing appliance shown in FIG. 1, taken along line 3—3 of FIG. 1.

Referring to FIGS. 3 and 4, a sensor 36 is positioned within the housing 14 and transmits a signal when the bowl 22 and bowl lid 24 are in the working position. In the preferred embodiment, the sensor is a momentary switch 36 that is mounted by a bracket 38 within the housing 14 on an underside of the first shell half 14a adjacent a location where the drive shaft 26 exits the first shell half 14. The sensor is not limited to being mounted by the bracket 38 to the underside of the first shell half 14a and may be mounted nearly anywhere on the housing 14 using nearly any mounting mechanism that would be obvious to one having ordinary skill in the art. In addition, the sensor is not limited to the momentary switch 36 and may be comprised of nearly any sensor or switch that transmits a signal when the bowl 22 and bowl lid 24 are in the working position. For example, the sensor may be comprised of a magnetic switch that is actuated to one of a closed and open position when magnets on the bowl 22 and bowl lid 24 are aligned with the sensor (not shown).

In the preferred embodiment, the momentary switch 36 is closed when the bowl 22 and bowl lid 24 are in the working position and is open when the bowl 22 and bowl lid 24 are in any other position. Referring to specifically, to FIG. 4, in the preferred embodiment, the momentary switch 36 is closed through contact with a switch arm 66 that is attached to a movable portion of the drive shaft 26. When the switch 36 is closed, power is able to be provided to the motor 16.

Referring to FIG. 4, in the preferred embodiment, the drive shaft 26 is comprised of a hollow drive sleeve 26a and a movable drive pin 26b. The drive pin 26b is movable along a drive axis 40 within the drive sleeve 26a between an extended position and a retracted position. The drive pin 26b is biased toward the extended position by a drive spring 42 located between the housing 14 and an E-clip 44 that is fixed to the drive pin 26b. The drive spring 42 also biases the switch arm 66 away from the momentary switch 36. That is, the switch arm 66 moves with the drive pin 26b between the extended and retracted positions. Accordingly, when the drive pin 26b is not in the retracted position, the switch arm 66 does not contact the momentary switch 36 and the momentary switch 36 is open.

In the preferred embodiment, the bowl lid 24 includes an actuating pin 46 that extends from a position near a center of an inner surface of the top bowl lid wall 42b. Preferably, the pin 46 extends downwardly along the drive axis 40. Therefore, when the bowl lid 24 is mounted to the bowl 22 and the bowl 22 is mounted to the housing 14 in the working position, the pin 46 enters a hole in the top of the hollow drive sleeve 26a to engage and urge the drive pin 26b downwardly against the force of the drive spring 42 from its biased extended position to its retracted position. When the drive pin 26b moves to the retracted position, the switch arm 66 is also moved downwardly and into contact with the momentary switch 36 to close the switch 36 such that power may be provided to the motor 16.

Referring to FIGS. 1–4, an indicator 12 includes a transparent plate 48 that is mounted around a periphery of the control mechanism 30. The transparent plate 48 preferably has a generally annular-shape and is constructed from an injection molded polycarbonate material. The annular transparent plate 48 extends around the entire periphery of the dial 34 in the preferred embodiment. The transparent plate 48 is not limited to annular-shapes or to constructions using injection molded polycarbonate material. The transparent plate 48 may take on nearly any shape such that it is mountable around at least a portion of the periphery of the control mechanism 30. In addition, the transparent plate 48 is not limited to polycarbonate materials and may be constructed of nearly any material that is transparent and is able to withstand the normal operating conditions of the transparent plate 48. For example, the transparent plate 48 may be constructed of a glass, transparent polymeric or other like material that permits the transmission of light from the cylindrical portion to the exposed surface 48a of the transparent plate 48. However, it is preferred that the transparent plate 48 surround the control mechanism 30 to provide a visual indication to a user immediately adjacent the control mechanism 30. The visual indication adjacent the control mechanism 30 is preferred so that a user is aware that actuation of the dial 34 will prompt the food processing appliance 10 to operate when the transparent plate 48 is illuminated but will not begin operation if the transparent plate 48 is not illuminated.

The indicator 12 preferably includes a light emitting device 50, a cone-shaped reflector 52 and the transparent plate 48. The light emitting device 50 is preferably mounted to an apex 52a of the reflector 50 such that the reflector 52 directs light from the light emitting device 50 onto at least the transparent plate 48. In addition, in the preferred embodiment, the transparent plate 48 is mounted adjacent a mouth 52b of the reflector 52. Accordingly, when the light emitting device 50 is illuminated, the general cone-shape of the reflector 52 directs light from the light emitting device 50 onto the transparent plate 48. Light is transmitted through the transparent plate 48 to provide a visual indication to a user at an exterior of the housing 14 at the periphery of the control mechanism 30 when the light emitting device 50 is illuminated.

In the preferred embodiment, the reflector 52 is constructed of an injection molded ABS material that is chrome plated. The injection molded ABS material is preferred for the reflector 52 due to its generally clean surface appearance after molding and its ability to withstand the processing of and adhere to the chrome plating material. Chrome plating of the reflector 52 is preferred such that light is readily reflected from the light emitting device 50 and on to the transparent plate 48. The reflector 52 is not limited to being chrome plated and may have nearly any surface finish or appearance that permits light to be directed from the reflector 52 toward the transparent plate 48. For example, the inside of the cone-shaped reflector 52 may be painted with a reflective material or may be constructed of a reflective glass material. In addition, the reflector 52 may not be coated at all and the finished ABS material may be sufficient to reflect light toward and onto the transparent plate 48. Further, the reflector 52 may be eliminated altogether and a generally annular or otherwise shaped light emitting device may be mounted around a periphery of the control mechanism 30 (not shown).

In the preferred embodiment, the control mechanism 30 and indicator 12 are each mounted to the housing 14 by a support plate 54 that has a generally disk-like shape with a central bore 54a that accommodates insertion of the control shaft 32a therethrough and peripheral slots 54b that permit the transmission of light therethrough and onto the transparent plate 48. The support plate 54 is mounted in an opening 56 formed at the parting line 14c in the preferred embodiment. The support plate 54 is preferably constructed of an injection molded SAN material but is not so limited. For example, the support plate 54 may be constructed of any metallic, polymeric, wood or other like, generally rigid material that is able to take on the general shape of the support plate 54 and withstand the normal operating conditions of the support plate 54.

Referring to FIGS. 1–4, the indicator 12 visually indicates that the bowl 22 and bowl lid 24 are in the working position upon receiving the signal from the sensor 36 such that power can be provided to the electric motor 16. Specifically, when the bowl lid 24 is mounted to the bowl 22 and the bowl 22 is mounted to the housing 14 in the working position, the pin 46 moves the drive pin 26b from its extended position to its retracted position against the biasing force of the drive spring 42. The switch arm 66 contacts and closes the momentary switch 36 which provides a signal to the electric motor 16 and enables power to be provided to the electric motor 16 when the drive pin 26b is in the retracted position. In addition, when the momentary switch 36 is closed, power is able to be provided to the light emitting device 50 which is illuminated. When the light emitting device 50 is illuminated, light is transmitted onto the chrome-plated reflector 52, which reflects light onto the transparent plate 48. The transparent plate 48 is illuminated by this light, thereby providing a visual indication around a periphery of the dial 34 that the bowl 22 and bowl lid 24 are in the working position and that power may be provided to the electric motor 16 for actuation of the tool 28.

When the bowl 22 and bowl lid 24 are in their working position, the dial 34 is pivoted to a selected one of its operating positions using the fin 34a and the motor 16 is actuated to drive the motor shaft 16a. The motor shaft 16a transmits rotational motion through the drive gear 18 to a gear reduction mechanism 58, which transmits the reduced rotational speed to the drive pin 26b, to the hollow sleeve 26a and to the tool 28 to process the food within the bowl 22.

At the conclusion of processing or to insert additional foodstuff into the bowl 22, the bowl lid 24 is removed from the bowl 22. When the bowl lid 24 is removed from the bowl 22, the actuating pin 46 releases the drive pin 26b, which moves from its retracted position to its extending position under the force of the drive spring 42. In the extended position of the drive pin 26b, the switch arm 66 is not in contact with the momentary switch 36 and the momentary switch 36 is open. Accordingly, power is not provided to the motor 16 or to the light emitting device 50, when the bowl lid 24 is removed from the bowl 22. In addition, a visual indication (i.e., no light on) is provided at the exposed surface 48a that the food processing appliance is not able to be operated because the transparent plate 48 is not illuminated.

Figure 5:
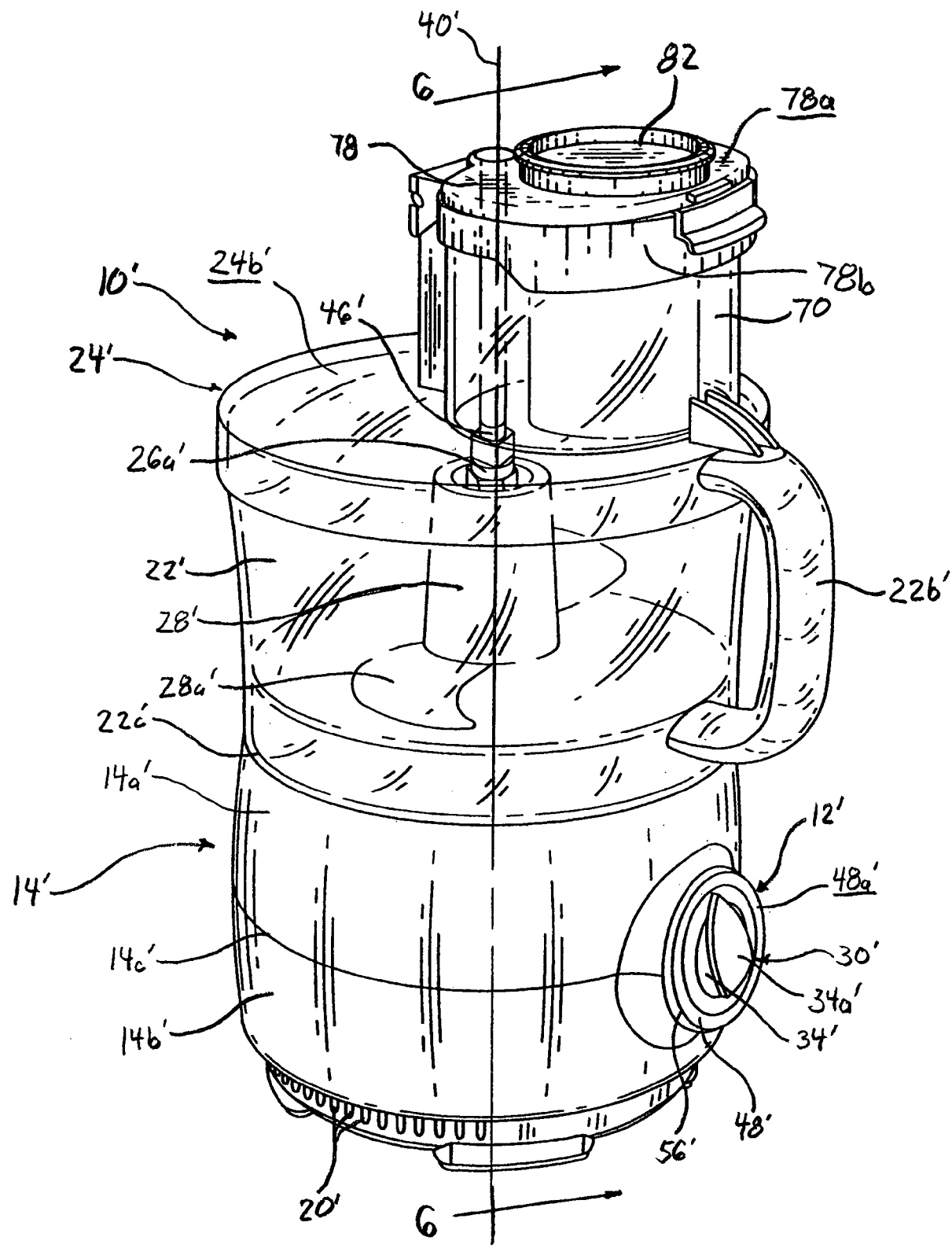
FIG. 5 is a top perspective view of a food processing appliance with an indicator in accordance with a second preferred embodiment of the present invention.
Figure 6:
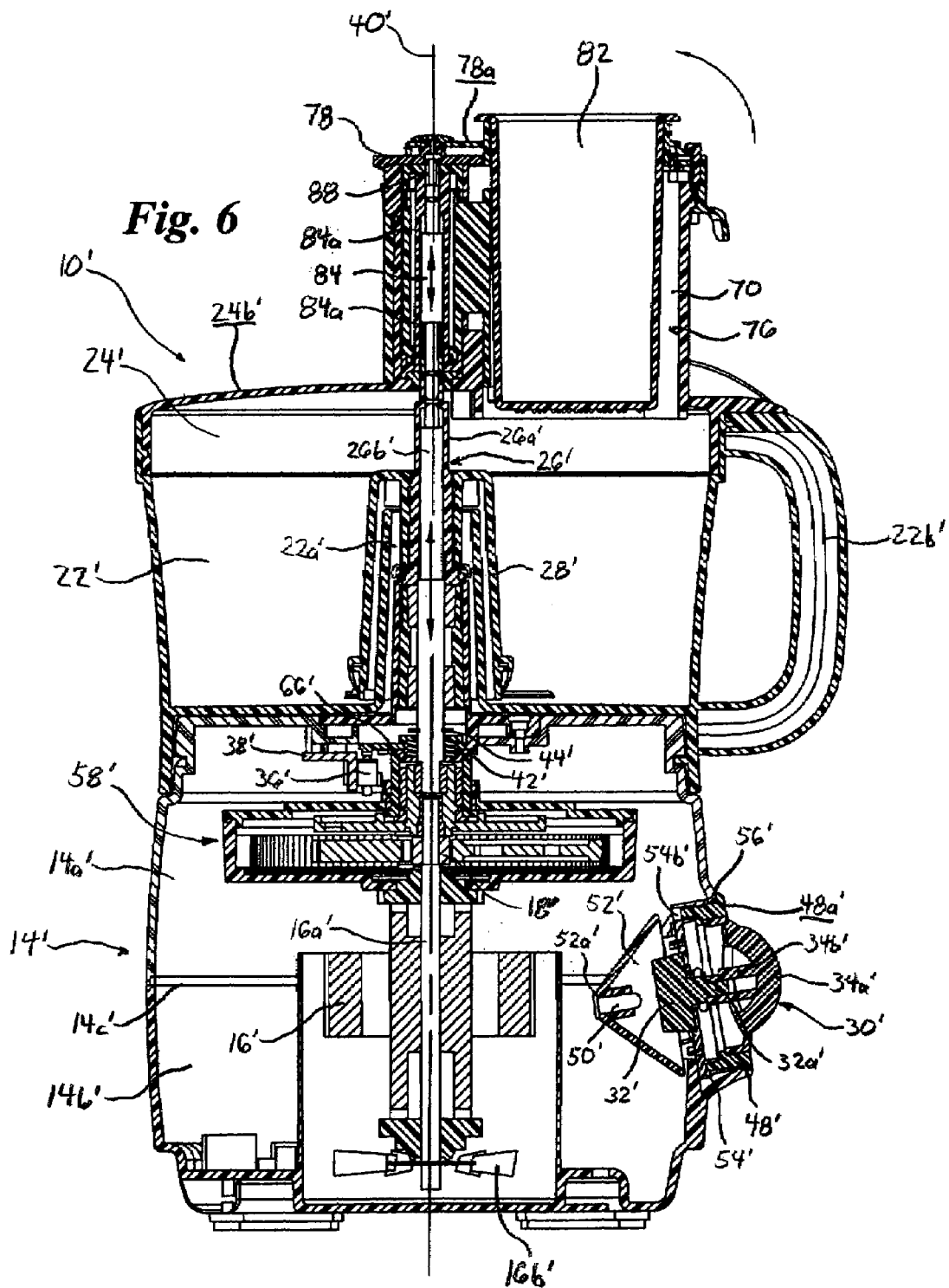
FIG. 6 is a cross-sectional view of the food processing appliance shown in FIG. 5, taken along line 6—6 of FIG. 5.
Figure 7:
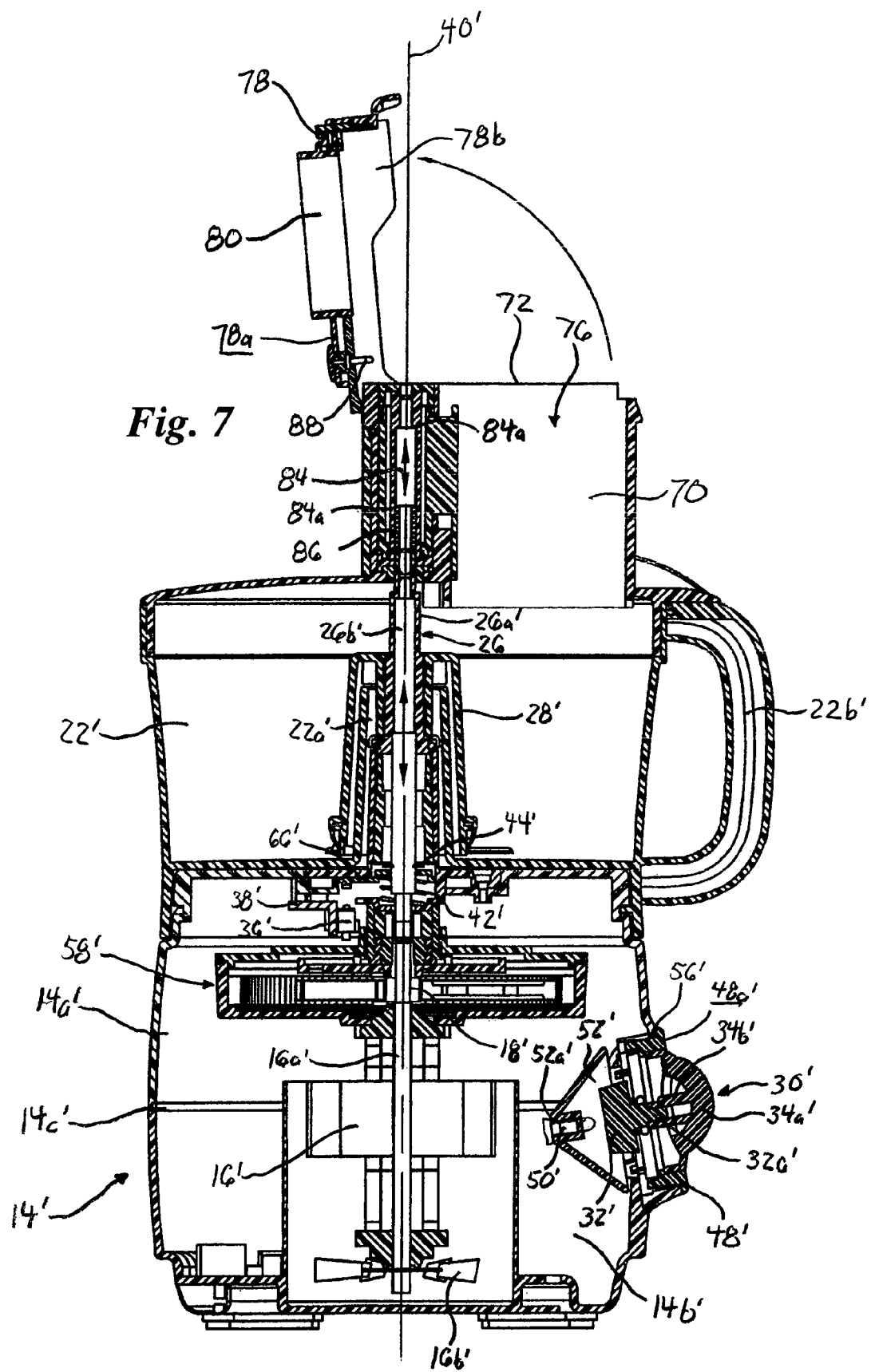
FIG. 7 is a cross-sectional view of the food processing appliance shown in FIG. 5, taken along line 6—6 of FIG. 5 with the feed tube cover in a loading position.

Referring to FIGS. 5–7, a second preferred embodiment of the food processing appliance 10' is shown including like reference numerals to indicate like elements and a prime symbol (') distinguishing the reference numerals of the second preferred embodiment.

The second preferred embodiment of the food processing appliance 10' includes a feed tube 70 extending from the top bowl lid wall 24b' of the bowl lid 24'. The feed tube 70 includes a feed mouth 72 and is preferably, integrally molded with the bowl lid 24'. The feed tube 70 is preferably constructed of the same SAN material as the bowl lid 24'. However, the feed tube 70 is not limited to constructions using the same SAN material or to being integrally molded with the bowl lid 24'. The feed tube 70 may be constructed of nearly any material that is able to take on the general shape of the feed tube 70 and withstand the normal operating conditions of the feed tube 70. The feed tube 70 construction and operation will be generally well know to one having ordinary skill in the art.

A feed tube cover 78 at least partially covers the feed mouth 72 in a closed position in the second preferred embodiment. The feed tube cover 78 is movable between a loading position (FIG. 7) and the closed position (FIG. 6). In the preferred embodiment, the feed tube cover 78 has a generally planar top surface 78a with a peripheral shape that generally covers the feed mouth 72 and further includes a peripheral skirt 78b extending downwardly therefrom. The feed tube cover 78 is preferably constructed of the same SAN material as the feed tube 70, bowl lid 24' and bowl 22'. However, the feed tube cover 78 is not limited to SAN material constructions and may be constructed of nearly any material that is able to take on the general shape of the feed tube cover 78 and withstand the normal operating conditions of the feed tube cover 78.

In the loading position, the mouth 72 is exposed and foodstuff may be inserted into the feed cavity 76 through the feed mouth 72. In the closed position, the peripheral skirt 78b extends about a periphery of the feed tube below the feed mouth 72 and along sides of the feed tube 70 to reduce the likelihood that foodstuff may escape the feed cavity 76 and that a user may insert a hand or at least one finger into the feed cavity 76 when the feed tube cover 78 is in the closed position or nearly in the closed position.

In the second preferred embodiment, the top surface 78a of the feed tube cover 78 has a hole 80 therein that slideably accommodates a food pusher 82. The food pusher 82 is preferably constructed of the same SAN material as the feed tube cover 78 and is likewise not limited to the SAN material. The construction and operation of the food pusher 82 and hole 80 are generally well known to those having ordinary skill in the art.

A feed tube shaft 84 is movably mounted within the feed tube 78 between an operating position (FIG. 6) and a safety position (FIG. 7) along the drive axis 40'. The feed tube shaft 84 is preferably biased toward the safety position by a tube spring 86. The feed tube shaft 84 preferably has a generally cylindrical shape that is tiered to provide abutment surfaces 84a for the application of a biasing spring force from the tube spring 86 between the bowl lid 24 and the feed tube shaft 84 and to provide a stop surface when the upper abutment surface 84a comes into contact with the feed tube 70. In the safety position, the upper abutment surface 84a of the feed tube shaft 84 come into contact with the feed tube 70 and the tube spring 86 is at its fully extended position.

The feed tube cover 78 includes a feed tube pin 88 attached thereto. The feed tube pin 88 preferably enters a hole in the feed tube 70 when the feed tube cover 78 is in the closed position. When the feed tube cover 78 is in the closed position, the pin 88 engages and urges the feed tube shaft 84 from its safety position to its operating position. The feed tube shaft 84 contacts the drive pin 26b' and urges it to its retracted position and the switch arm 66' closes the momentary switch 36' when the feed tube shaft 84 is in it operating position and the bowl 22' and bowl lid 24' are in the working position.

The second preferred embodiment of the food processing appliance 10' is not limited to the inclusion of the movable drive pin 26b', movable feed tube shaft 84 and feed tube pin 88 to actuate the momentary switch 36'. For example, the movable feed tube shaft 84 may be positioned along an outer edge of the feed tube 70 and a movable shaft would also be located adjacent a periphery of the bowl 22' (not shown). In such an arrangement, when the feed tube cover 78 was positioned in its closed position, the movable shaft at the periphery of the feed tube 70 would move to its operating position and the bowl shaft at the periphery of the bowl would move to its retracted position where it would close the momentary switch 36'. When the momentary switch 36' was closed, power would be provided to the motor 16' and the light emitting device 50'.

In operation of the second preferred embodiment of the food processing appliance 10', the bowl 22' is mounted to the housing 14', the tool 28' is rotatably mounted to the drive shaft 26', the bowl lid 24' is mounted to the bowl 22' and the feed tube cover 78 is positioned in its closed position over the mouth of the feed tube 70. In this position, the feed tube pin 88 urges the feed tube shaft 84 to it operating position and the feed tube shaft 84 urges the drive pin 26b' to its retracted position. When the drive pin 26b' is in the retracted position, the switch arm 66' contacts and closes the momentary switch 36', thereby permitting power to be provided to the motor 16' and the light emitting device 50'. Therefore, a visual indication is provided at the exposed surface 48a' to indicate that the food processing appliance 10' is prepared for operation when the bowl 22' and bowl lid 24' are positioned in their working position and the feed tube cover 78 is positioned in its closed position.

To insert additional foodstuff into the feed cavity 76 or bowl 22' without moving the bowl 22' or bowl lid 24' out of the working position, the feed tube cover 78 is rotated to its loading position. The feed tube pin 88 is moved out of contact with the feed tube shaft 84, which moves out of contact with the drive pin 26b' when the feed tube cover 78 is moved to its loading position. When the feed tube shaft 84 is moved out of contact with the drive pin 26b', the drive pin 26b' moves to its extended position and the momentary switch 36' is open. Therefore, power will not be provided to the motor 16' and the exposed surface 48a' will not be illuminated because the switch 36' is open.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A food processing appliance for processing foodstuff comprising:
   a housing;
   a bowl removably mountable to the housing;
   a bowl lid removably mountable over the bowl;
   a feed tube extending from a top bowl lid wall of the bowl lid, the feed tube including a feed mouth;
   a feed tube cover at least partially covering the feed mouth in a closed position, the feed tube cover being movable between a loading position and the closed position; and
   an indicator on the housing and indicating when the feed tube cover is in the closed position, the bowl lid is mounted over the bowl and the bowl is mounted to the housing in an operating position.

2. The food processing appliance of claim 1 further comprising:
   a control mechanism including a generally disc-shaped dial exposed from a surface of the housing, the indicator including a generally annular-shaped transparent plate that is mounted to the housing around the dial.

3. The food processing appliance of claim 1 further comprising:
   a momentary switch mounted within the housing, the momentary switch being in a closed position only when the bowl, bowl lid and feed tube cover are in the operating position.

4. The food processing appliance of claim 3 further comprising:
   a motor mounted within the housing, the motor being provided with electric power only when the switch is in the closed position.

* * * * *